(12) United States Patent
Schmidt et al.

(10) Patent No.: US 9,574,660 B2
(45) Date of Patent: Feb. 21, 2017

(54) HYDRAULIC FAN DRIVE SYSTEM

(71) Applicant: Federal Signal Corporation, Oak Brook, IL (US)

(72) Inventors: Joseph L. Schmidt, Tonica, IL (US); John D. Padgett, Elgin, IL (US)

(73) Assignee: Federal Signal Corporation, Oak Brook, IL (US)

( * ) Notice: Subject to any disclaimer, the term of this patent is extended or adjusted under 35 U.S.C. 154(b) by 317 days.

(21) Appl. No.: 14/186,701

(22) Filed: Feb. 21, 2014

(65) Prior Publication Data
US 2015/0240940 A1 Aug. 27, 2015

(51) Int. Cl.
*F16D 31/02* (2006.01)
*F16H 61/423* (2010.01)
*E01H 1/08* (2006.01)

(52) U.S. Cl.
CPC ....... *F16H 61/423* (2013.01); *B60Y 2200/144* (2013.01); *E01H 1/0845* (2013.01)

(58) Field of Classification Search
CPC .... F16H 61/421; F16H 61/423; F15B 21/042; E01H 1/0845
USPC .................. 60/445, 450, 456, 490
See application file for complete search history.

(56) References Cited

U.S. PATENT DOCUMENTS

| | | | | |
|---|---|---|---|---|
| 3,716,987 A | * | 2/1973 | Lonnemo | F16H 61/423 60/445 |
| 4,555,825 A | * | 12/1985 | Van Raaij | E01H 1/0827 60/456 |
| 5,907,952 A | * | 6/1999 | Akasaka | F16H 61/423 60/445 |
| 6,276,134 B1 | * | 8/2001 | Matsuyama | F16H 61/439 91/506 |
| 6,481,388 B1 | | 11/2002 | Yamamoto | |
| 6,860,105 B2 | * | 3/2005 | Yano | F16H 61/423 60/490 |
| 8,006,813 B2 | | 8/2011 | James et al. | |
| 8,491,444 B1 | | 7/2013 | Li et al. | |
| 2004/0003782 A1 | | 1/2004 | Ziplies et al. | |
| 2008/0238607 A1 | | 10/2008 | Schuricht et al. | |
| 2010/0287926 A1 | | 11/2010 | Ogasawara et al. | |
| 2012/0060777 A1 | | 3/2012 | Tikkanen et al. | |
| 2012/0134848 A1 | | 5/2012 | Nelson et al. | |

* cited by examiner

Primary Examiner — Michael Leslie
(74) Attorney, Agent, or Firm — Merchant & Gould P.C.

(57) ABSTRACT

A debris collection vehicle having an enclosed volume for collecting debris and a hydraulic fan drive system for creating vacuum condition in the enclosed volume is disclosed. In one embodiment, the hydraulic fan system includes a closed loop hydraulic circuit, a variable displacement hydraulic pump disposed within the closed loop circuit, and a hydraulic motor disposed within the closed loop circuit. The hydraulic fan drive system can also include an electronic or hydraulically actuated control valve constructed and arranged to adjust the output of the hydraulic motor via a displacement actuator based on pressure in the closed loop hydraulic circuit.

19 Claims, 6 Drawing Sheets

HYDRAULIC FAN DRIVE SYSTEM

BACKGROUND

Debris collection vehicles, such as sewer cleaners, hydro-excavators, and street sweeping vehicles are often provided with an enclosed volume, for example a hopper or collection tank, for retaining collected debris. Generally, a fan is also provided that is configured to draw a vacuum condition within the enclosed volume. In some implementations, the fan is directly driven by an auxiliary engine of the vehicle via a gear box. However, such an approach limits the fan performance by the amount of torque that can be produced by the auxiliary engine. In other implementations, the fan is driven by a fixed displacement hydraulic motor that is driven by a pump. However, this approach can require the motor and the pump to operate at or over their respective maximum rated speeds for successful operation, which can decrease equipment life. Improvements are desired.

SUMMARY

A debris collection vehicle having a hydraulic fan drive system is disclosed. The debris collection vehicle can include a main power plant that powers vehicle driving functions and an optional auxiliary power plant that powers vehicle non-driving functions. The debris collection vehicle can also include a tank or hopper for collecting debris.

In one aspect, the hydraulic fan system includes a closed loop hydraulic circuit, a hydraulic pump disposed within the closed loop circuit and having an inlet and an outlet, and a hydraulic motor disposed within the closed loop circuit. The hydraulic motor can be provided with an output shaft, an inlet in direct fluid communication with the variable displacement pump outlet, and an outlet in direct fluid communication with the variable displacement pump inlet. In one embodiment, the hydraulic pump is driven by the primary or auxiliary power plant.

The hydraulic fan drive system can also include a fan coupled to the output shaft of the hydraulic motor. In one aspect the fan includes an inlet that is in fluid communication with the vehicle tank or hopper such that the fan can draw a vacuum condition within the tank or hopper. The hydraulic fan drive system can also include a control valve constructed and arranged to adjust the output of the hydraulic motor based on pressure in the closed loop hydraulic circuit.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
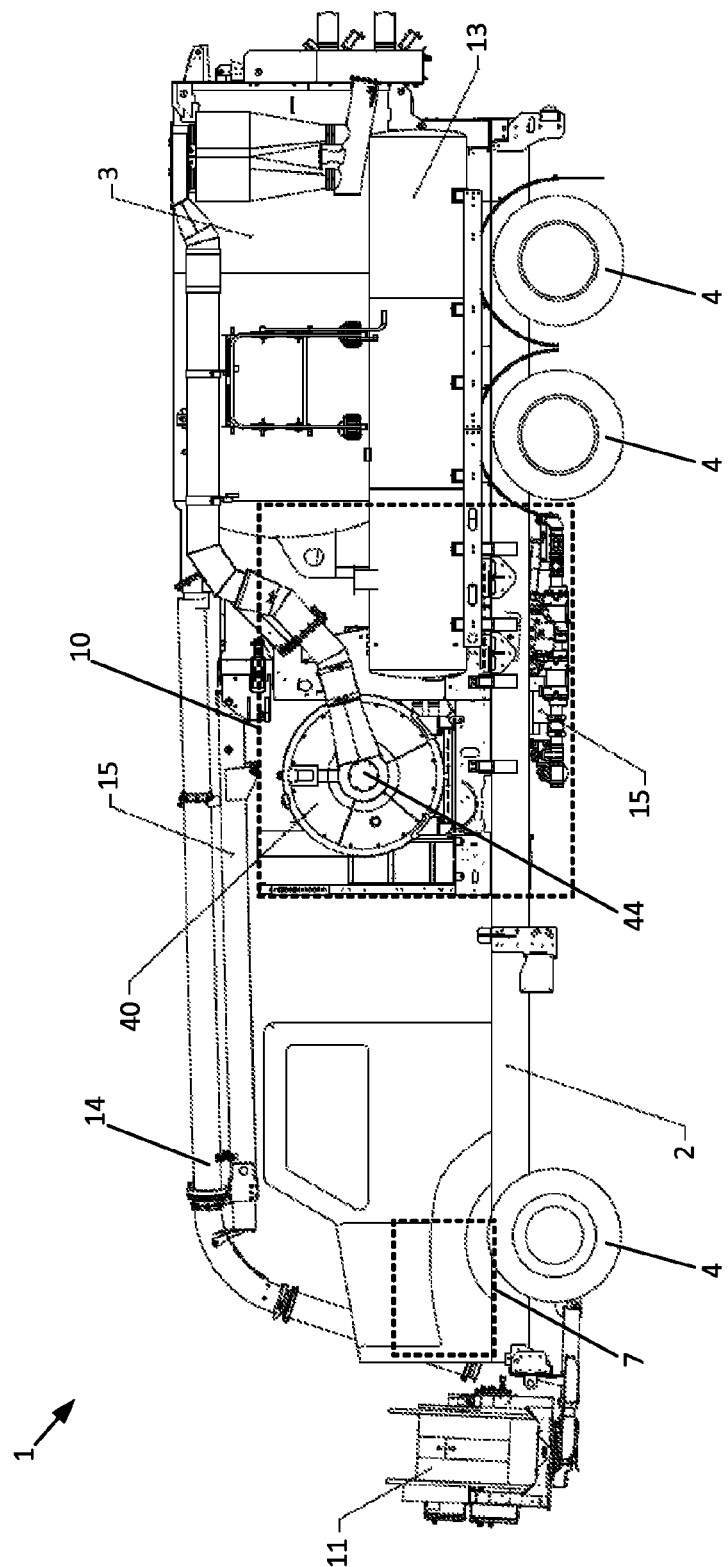
FIG. 1 is a side view of a debris collection vehicle and hydraulic vacuum fan drive system having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 6:
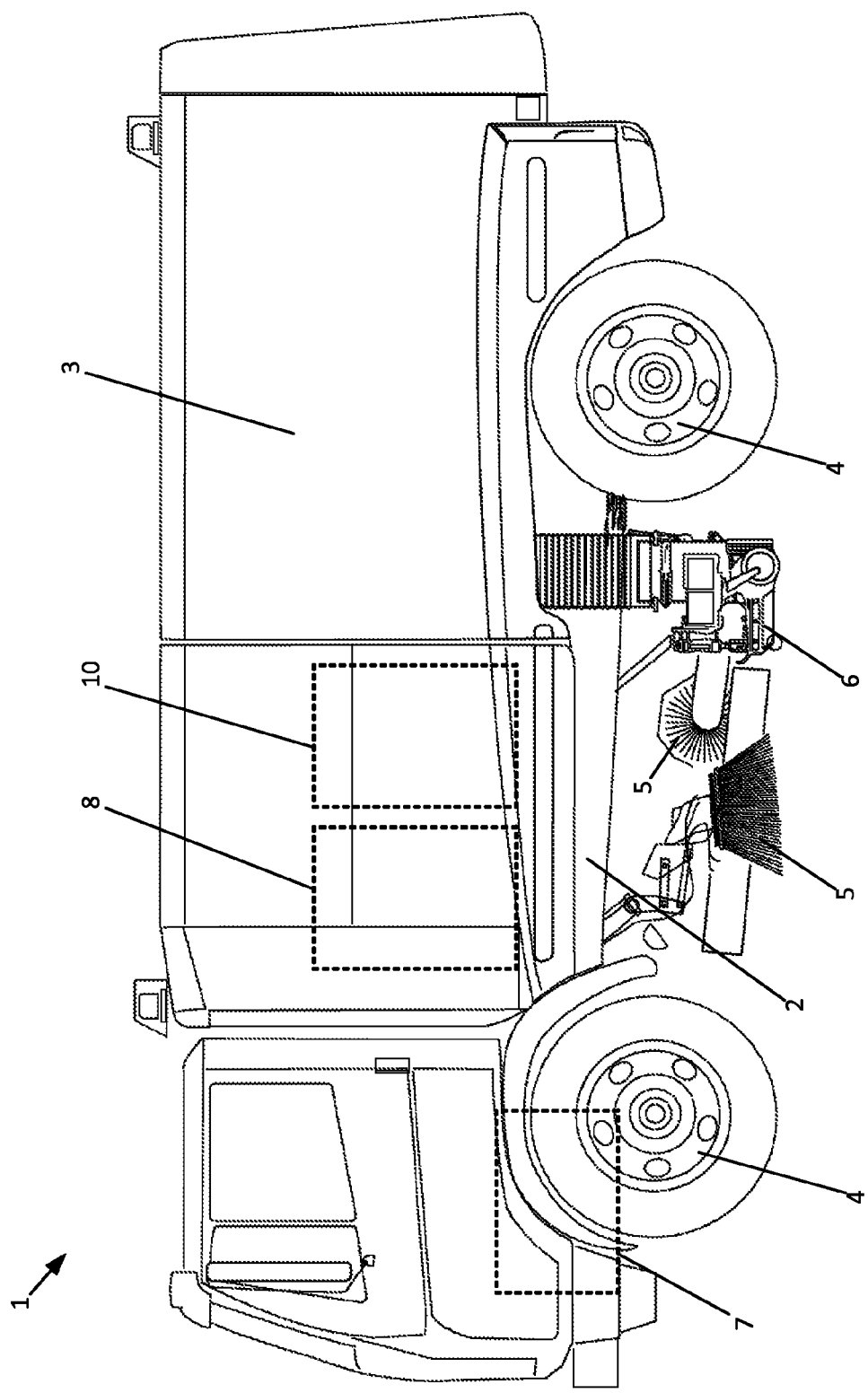
FIG. 6 is a side view of a second embodiment of a debris collection vehicle and hydraulic vacuum fan drive system having features that are examples of aspects in accordance with the principles of the present disclosure.

Referring to FIGS. 1 and 6, examples of debris collection vehicles 1 are shown. In the embodiment shown at FIG. 1, the vehicle 1 is a sewer cleaning vehicle. As shown, the sewer cleaning vehicle 1 includes a chassis 2, a debris collection tank 3, wheels 4, a hose reel 11, water tanks 13, and a water pumping system 15. The vehicle 1 can also include a power delivery system having a chassis or primary power system 7, which may be an internal combustion engine. The vehicle 1 may also be provided with an optional auxiliary power system. The primary power system 7 provides power for both the driving and non-driving functions of the vehicle 1. Examples of driving functions that require power are the vehicle drive train, the steering system, and the braking system. Examples of non-driving functions associated with the vehicle 1, are pumps and motors relating to the debris collection process. Vehicle 1 is also shown as including a hydraulic vacuum fan drive system 10, shown at FIG. 2, that is powered by the primary power system 7, or optionally, an auxiliary power system. The fan drive system 10 is connected to the debris collection tank 3 such that debris can be collected by a suction hose 14 that is also connected to the debris collection tank 3.

In the embodiment shown at FIG. 6, the vehicle 1 is a street sweeping vehicle. As shown, the street sweeping vehicle 1 includes a chassis 2, a hopper 3, wheels 4, brooms 5, and a vacuum nozzle 6. The vehicle 1 can also include a power delivery system having a chassis or primary power system 7 and an optional auxiliary power system 8, both of which may be internal combustion engines. The primary power system 7 is primarily responsible for providing power for the driving functions of the vehicle 1. Examples of driving functions that require power are the vehicle drive train, the steering system, and the braking system. The auxiliary power system 8 is primarily for providing power to auxiliary operations associated with the vehicle 1, for example hydraulic functions can be driven by a hydraulic pump. Examples of auxiliary components that require power in a street sweeper application are fans/blowers, scarifying brooms, and the hopper. It is noted that the vehicle 1 can be provided with only a primary power system 7 and that the auxiliary functions can be driven from the primary power system 7. As shown at FIG. 6, vehicle 1 includes a hydraulic vacuum fan drive system 10 that is powered by the auxiliary power system 8.

Figure 2:
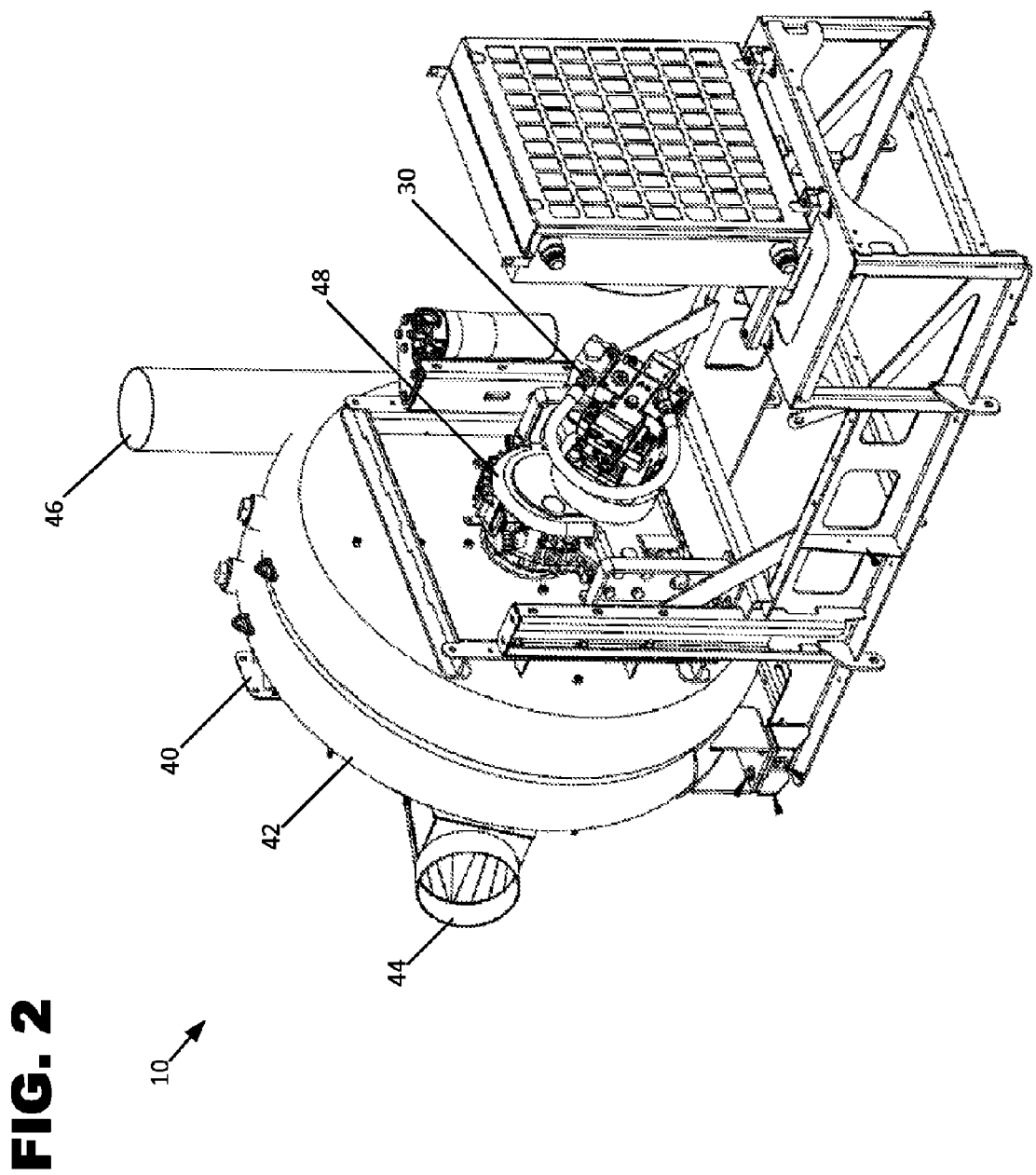
FIG. 2 is a perspective view of a hydraulic fan drive system suitable for use in a debris collection vehicle.

Referring to FIG. 2, the hydraulic fan drive system 10 is shown in greater detail. Hydraulic fan drive system 10 is for providing a vacuum in the hopper 3 such that debris can be collected into enclosed volume or hopper 3. As shown, the hydraulic fan drive system 10 includes a fan assembly 40 having a fan 41 (see FIGS. 4, 5) within a housing 42 provided with an air inlet 44 and an air outlet 46. As the fan 41 is rotated, air is moved from the inlet 44 to the outlet 46. In the configuration shown at FIG. 1, the fan inlet 44 is in fluid communication with the enclosed volume 3 such that operation of the fan assembly 40 causes the interior of the enclosed volume 3 to be drawn into a vacuum condition.

The hydraulic fan drive system 10 can also be provided with a hydraulic motor 30. Hydraulic motor 30 is for driving the fan 41 of the fan assembly 40. As shown, the hydraulic motor 30 has an output shaft 32 (FIG. 4) which drives the gear train within a gear box 48 (FIG. 2) which in turn drives the fan of the fan assembly 40. The gear box 48 can be configured as step up or a step down gear configuration in which the rotational speed of the fan 41 will be either greater than or less than, respectively, the rotational speed of the output shaft 32. Alternatively, the output shaft 32 of the hydraulic motor 30 can be directly connected to the fan 41 of the fan housing 40.

The hydraulic motor 30 may be configured as variable displacement motor, such as an axial variable displacement motor with a swash plate or a bent axis variable displacement motor. A suitable hydraulic motor 30 is an H1 Series variable displacement bent axis hydraulic motor available from Danfoss Power Solutions US of Ames, Iowa.

Figure 3:
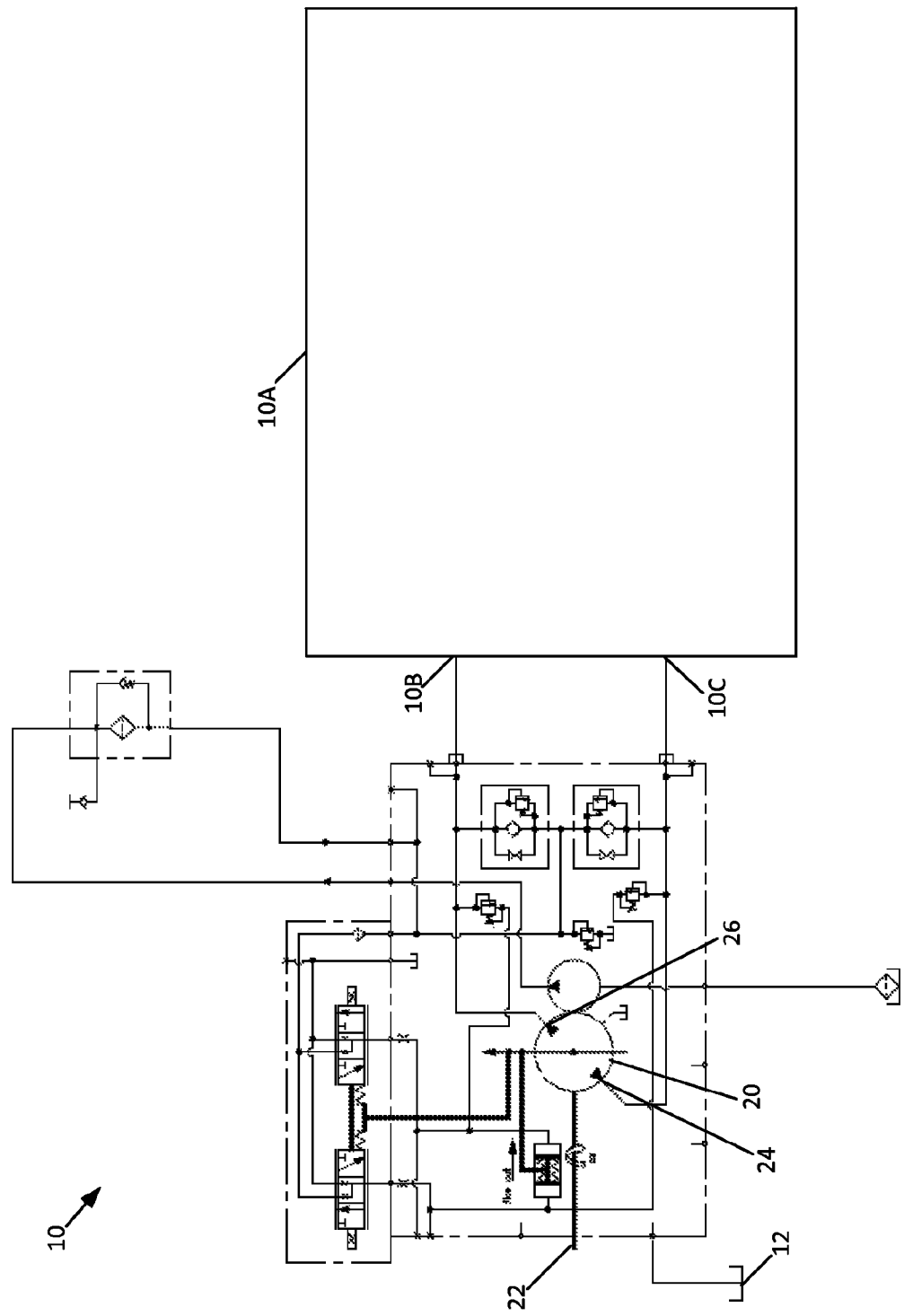
FIG. 3 is a schematic view of the hydraulic fan drive system shown in FIG. 2.

With reference to FIG. 3, a hydraulic schematic of the hydraulic fan drive system 10 is shown. As can be seen, the hydraulic fan system 10 further includes a hydraulic pump 20 that has an input shaft 22 that may be driven by, for example, the primary power plant or engine 7 (e.g. FIG. 1) or the auxiliary power plant or engine 8 (e.g. FIG. 6). Where the hydraulic pump 20 is driven by the primary power plant 7, the hydraulic pump 20 may be mounted to a gear box or to the front crank of the power plant. Hydraulic pump 20 further includes an inlet port 24 and an outlet port 26. In operation, and as the input shaft 22 is rotated, hydraulic fluid is moved from the inlet port 24 to the outlet port 26. The hydraulic pump 20 is shown as being configured as a variable displacement pump.

Figure 4:
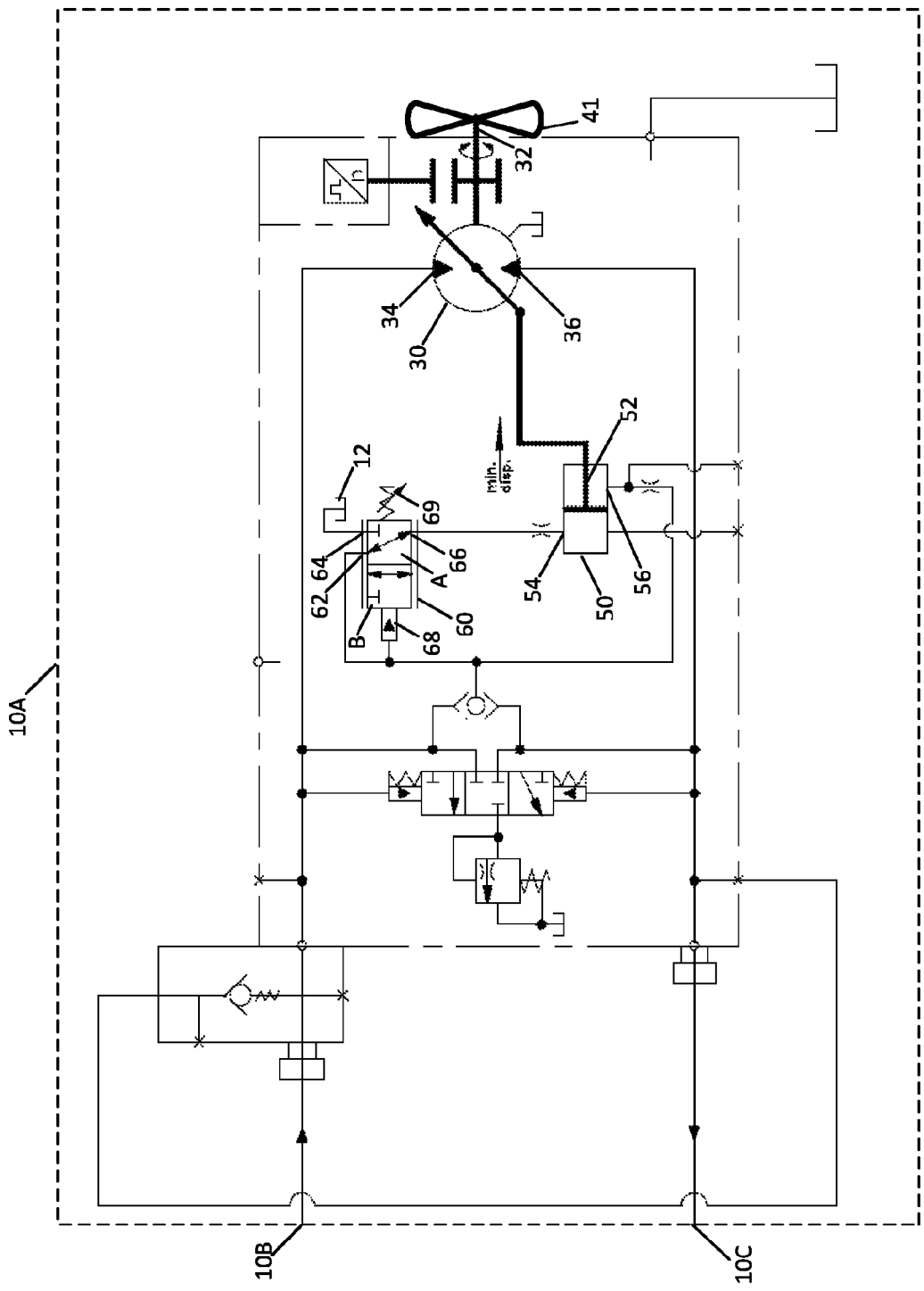
FIG. 4 is a schematic view of a first embodiment of a drive portion of the hydraulic fan drive system shown in FIG. 3.

With reference to FIG. 4, which shows section 10A of system 10 in greater detail, the hydraulic motor 30 may be provided with an inlet port 34 for receiving pumped hydraulic fluid from the pump outlet port 26 and an outlet port 36 for returning the hydraulic fluid back to the pump inlet port 24. In operation, as the pump 20 delivers hydraulic fluid to the hydraulic motor inlet port 34, through the hydraulic motor 30, and to the outlet port 36, the output shaft 32 is caused to rotate, thereby powering the fan assembly 40 (FIG. 2). In such a configuration where the pump outlet 26 is in direct fluid communication with the motor inlet 34 and the pump inlet 24 is in direct fluid communication with the motor outlet 36 (i.e. the pump inlet 24 and motor outlet 36 are not in direct fluid communication with the reservoir 12), the fluid circuit may be termed herein as closed hydraulic circuit. However, it is noted that even in such a circuit, fluid is allowed to enter and leave the system through other components provided in the system, such as the flushing valve and control valve 60 (discussed later).

As stated previously, hydraulic motor 30 may be provided as a variable displacement motor. In such a configuration, the hydraulic fan system 10 may be provided with an actuator 50 that is provided with a piston 52 to modify the displacement of the hydraulic motor 30. As shown, actuator 50 also has an inlet port 54 and an outlet port 56. In operation, when hydraulic fluid is allowed to flow into the inlet port 54 and force the piston 52 in a first direction, and thereby causing hydraulic fluid to purge from the outlet port 56 on the other side of the piston 52, the displacement of the motor 30 is decreased. This results in the hydraulic motor 30 (and connected fan 41) having a decreased rotational speed and a high torque output. Oppositely, when hydraulic fluid is allowed to flow in to the outlet port 56 and force the piston in 52 in a second direction opposite the first direction such that hydraulic fluid is purged from the inlet port 54, the displacement of the motor 30 is increased. This condition results in the hydraulic motor 30 (and connected fan 41) having an increased rotational speed, but at a lower torque output.

In one aspect, a control valve 60 (FIG. 4) is provided that is in fluid communication with the hydraulic pump 20 and with the actuator 50 (FIG. 4). The control valve 60 is for controlling the flow of hydraulic fluid to the actuator 50 such that the displacement of the hydraulic motor 30 is ultimately controlled by the operation of the control valve 60. As shown, the control valve 60 is configured as a two-position, three port valve having, as shown in FIG. 4, a first position A, a second position B, a first port 62, a second port 64, and a third port 66. The control valve 60 may be provided as a spool and sleeve type valve although other configurations and types are possible without departing from the concepts presented herein.

In the first position A of the control valve 60, the first port 62 is placed in fluid communication with the third port 66 such that pumped fluid from the hydraulic pump 20 flows into the inlet port 54 of the actuator 50. Accordingly, when the control valve 60 is moved towards the first position A, the displacement of the hydraulic motor is minimized thereby placing the motor 30 in a low speed, high torque condition. In the second position B of the control valve 60, the first port 62 is blocked, the second port 64 is placed in fluid communication with the reservoir 12, and the third port 66 remains in fluid communication with the actuator inlet port 54.

As shown at FIG. 4, the control valve 60 is biased towards the first position A by a spring 69, which may be configured as a variable resistance spring. The control valve 60 is also provided with a pilot actuator 68 that moves the control valve towards the second position B when system pressure is sufficient to overcome the resistance of the spring 69. With this configuration, the displacement of the hydraulic motor 30 is controlled by the system pressure such that the displacement is increased when system pressure is high and decreased when system pressure is low, which would respectively correspond to high and low torque load conditions on the fan 41 of the fan assembly 40.

Figure 5:
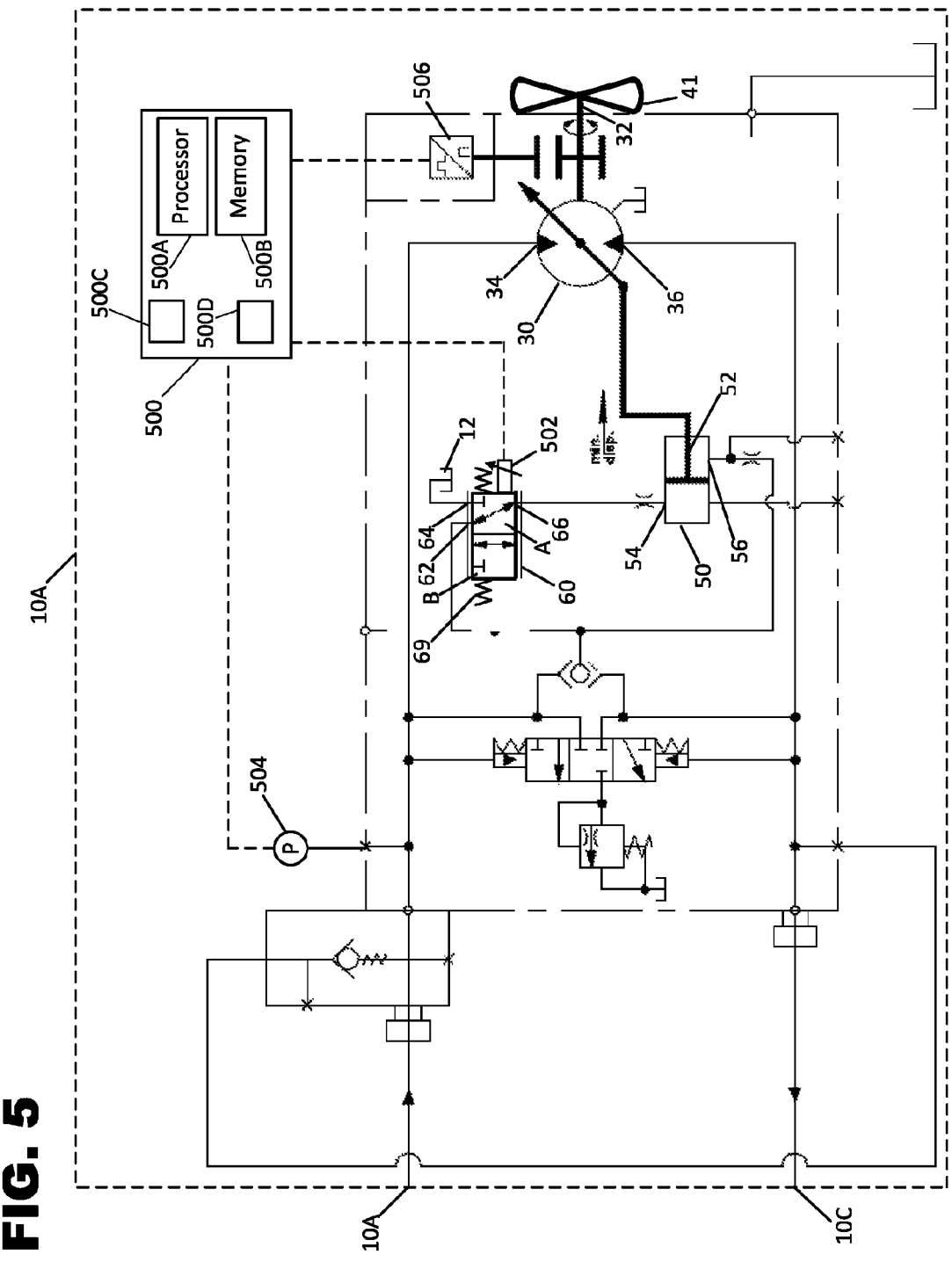
FIG. 5 is a schematic view of a second embodiment of a drive portion of the hydraulic fan drive system shown in FIG. 3.

In contrast to the entirely hydraulic system shown in FIG. 4, the hydraulic fan drive system may also include an electronic controller 500 to control the output of the hydraulic motor based on operational parameters of the system, for example a sensed system pressure and a sensed fan/shaft rotational speed. Such a configuration is shown at FIG. 5. The electronic controller 500 is schematically shown as including a processor 500A and a non-transient storage medium or memory 500B, such as RAM, flash drive or a hard drive. Memory 500B is for storing executable code, the operating parameters, and the input from the operator user interface 500D while processor 500A is for executing the code. The electronic controller is also shown as including a transmitting/receiving port 500C, such as a vehicle CAN bus. A user interface 500D may also be provided to activate and deactivate the system, allow a user to manipulate certain settings or inputs to the controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Electronic controller 500 is also shown as having a number of inputs/outputs that may be used for implementing desired operational modes of the hydraulic fan drive system 10. For example, electronic controller 500 provides outputs for commanding the control valve 60 via an electric or electronic actuator 502 (e.g. modulating solenoid valve, voice coil, etc.) as needed to meet the output demands of the system 10 (e.g. a fan speed set point, a vacuum pressure set point, a hydraulic system pressure set point, etc.). Likewise, electronic controller 500 receives inputs for the control of the fan drive system, for example an input from pressure sensor 504 and an input from shaft speed sensor 506.

In such a configuration, the hydraulic pilot actuator 68 is no longer utilized and the actuator 502 controls motor displacement. In the example shown at FIG. 5, the control valve 50 controls the displacement of motor 30 such that the displacement is increased when the actuator 502 is de-energized and decreased when the actuator 502 is energized. In one configuration, the spring 69 can be placed connected to the piston rod 52 of the actuator 50 such that the movement of the piston 52 acts to move the valve 60 into the first position A.

The fan operation and speed may be established as an electronic set point within controller 500 or may be set through the use of one or more physical knobs, switches, and/or buttons. For example, the fan speed operation can be enabled by an ON/OFF rotary switch while the desired fan speed setting can be established by a LOW/MEDIUM/HIGH rotary switch configured to limit the maximum flow of hydraulic fluid out of the hydraulic pump 20 such that the maximum fan speed is controlled. In one example, the controller 500 is configured to provide a proportional output signal to a control valve that controls the displacement of the pump 20 based on the setting of the rotary switch.

In one aspect, the LOW setting can be configured such that vacuum airflow, and thus power consumption, is minimized. Such a configuration would supply just enough air to minimize fluid (sewage) dripping from a suction hose while the operator changes vacuum tubing. The MEDIUM setting can be configured to allow the vacuum fan 41 to consume a fixed portion of the engine's reserve power, for example a portion which is not already allocated to the other truck systems (e.g. auxiliary hydraulics, high pressure water pump, electrical, air conditioning, cooling fan, etc.). The engagement, or disengagement, of these other truck systems does not alter the level of power apportioned to the vacuum fan. At this fixed power limit, the use of a variable displacement hydraulic motor 30 allows for a wider range of fan speeds than that which would be available using a fixed displacement hydraulic motor 30, resulting in a more versatile system. The HIGH setting can be configured to allow the vacuum fan to consume as much power as is needed to maintain maximum vacuum performance, up to the intended system maximum. At this power setting, the variable displacement motor 30 continues to provide the wide range of fan speeds desired but at a horsepower level that is lower than that of a comparable system using a fixed displacement motor. This speed versus torque tradeoff can be accomplished completely within the hydraulic motor 30 and is transparent to the user.

The above described hydraulic fan drive system 10, in both the purely hydraulic embodiment and the electronically controlled embodiment, decreases maintenance, lowers noise and emissions, and has less weight that conventional fan drive systems. Also, the use of the disclosed system with a variable output hydraulic motor allows for the system to more easily accommodate the typical varying fan loading conditions that are experienced when utilizing a fan to produce a vacuum in an enclosed volume into which debris is being collected. Additionally, the hydraulic pump and motor are expected to have significantly longer operational lives as neither component is required to be continuously run at maximum rated speed for successful operation. Furthermore, the disclosed hydraulic fan drive system 10 allows for a relatively smaller pump which reduces system first costs and operational costs.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic fan drive system comprising:
   (a) a closed loop hydraulic circuit;
   (b) a hydraulic pump disposed within the closed loop circuit and having an inlet and an outlet;
   (c) a hydraulic motor disposed within the closed loop circuit, the hydraulic motor having:
      i. an output shaft;
      ii. an inlet in direct fluid communication with the variable displacement pump outlet; and
      iii. an outlet in direct fluid communication with the variable displacement pump inlet;
   (d) a fan coupled to the output shaft of the hydraulic motor; and
   (e) a control valve constructed and arranged to adjust the output of the hydraulic motor based solely on pressure in the closed loop hydraulic circuit at a location defined between the hydraulic pump inlet and outlet and the hydraulic motor inlet and outlet.

2. The hydraulic fan drive system of claim 1, wherein the hydraulic motor is an axial piston motor.

3. The hydraulic fan drive system of claim 2, wherein the hydraulic motor is a variable displacement motor.

4. The hydraulic fan drive system of claim 3, wherein the hydraulic motor is a bent axis variable displacement motor.

5. The hydraulic fan drive system of claim 3, further comprising a motor displacement actuator having a first port and a second port, the actuator being adapted to:
   (a) decrease the displacement of the variable displacement motor when hydraulic fluid from the hydraulic pump outlet enters the first port and hydraulic fluid exits the second port; and
   (b) increase the displacement of the variable displacement motor when hydraulic fluid from the hydraulic pump enters the second port and hydraulic fluid exists the first port.

6. The hydraulic fan drive system of claim 5, wherein the control valve is a spool and sleeve type valve.

7. The hydraulic fan drive system of claim 6, wherein the control valve is biased to a first position by a spring in contact with the control valve, the first position allowing hydraulic fluid from the pump to enter the first port of the pump displacement actuator.

8. The hydraulic fan drive system of claim 6, wherein the control valve is movable to a second position by a valve actuator, the second position allowing hydraulic fluid from the actuator first port to drain to a hydraulic system reservoir.

9. The hydraulic fan drive system of claim 8, wherein the valve actuator is a hydraulic pilot actuator in fluid communication with the outlet of the hydraulic pump.

10. The hydraulic fan drive system of claim 8, wherein the valve actuator is an electric actuator.

11. The hydraulic fan drive system of claim 10, further comprising an electronic controller configured to provide an output signal to the electric actuator.

12. The hydraulic fan drive system of claim 11, further comprising a system pressure sensor and a hydraulic motor output shaft speed sensor that provide inputs to the electronic controller, wherein the output signal to the electric actuator is a function of the sensed hydraulic system pressure and the hydraulic motor output shaft speed.

13. A debris collection vehicle comprising:
   (a) at least one of a main power plant and an auxiliary power plant;
   (b) an enclosed volume for collecting debris;
   (c) a hydraulic fan drive system including:
      i. a closed loop hydraulic circuit;
      ii. a hydraulic pump disposed within the closed loop circuit and having an inlet and an outlet, the hydraulic pump being driven by the primary power plant or the auxiliary power plant;
      iii. a variable displacement hydraulic motor disposed within the closed loop circuit, the hydraulic motor having:
         1. an output shaft;
         2. an inlet in direct fluid communication with the variable displacement pump outlet; and
         3. an outlet in direct fluid communication with the variable displacement pump inlet;
      iv. a vacuum fan coupled to the output shaft of the hydraulic motor, the vacuum fan having a suction inlet in fluid communication with the vehicle enclosed volume; and
      v. a control valve constructed and arranged to adjust the output of the hydraulic motor based solely on pressure in the closed loop hydraulic circuit at a location defined between the hydraulic pump inlet and outlet and the hydraulic motor inlet and outlet.

14. The debris collection vehicle of claim 13, further comprising a motor displacement actuator having a first port in fluid communication with the control valve and a second port, the actuator being adapted to:
   (a) decrease the displacement of the variable displacement motor when hydraulic fluid from the hydraulic pump outlet enters the first port and hydraulic fluid exits the second port; and
   (b) increase the displacement of the variable displacement motor when hydraulic fluid from the hydraulic pump enters the second port and hydraulic fluid exists the first port.

15. The debris collection vehicle of claim 14, wherein:
   (a) the control valve is biased to a first position by a spring in contact with the control valve, the first position allowing hydraulic fluid from the pump to enter the first port of the pump displacement actuator; and
   (b) the control valve is movable to a second position by a valve actuator, the second position allowing hydraulic fluid from the actuator first port to drain to a hydraulic system reservoir.

16. The debris collection vehicle of claim 15, wherein the valve actuator is a hydraulic pilot actuator in fluid communication with the outlet of the hydraulic pump.

17. The debris collection vehicle of claim 15, wherein the valve actuator is an electric actuator.

18. The debris collection vehicle of claim 17, further comprising an electronic controller configured to provide an output signal to the electric actuator.

19. The debris collection vehicle of claim 18, further comprising a system pressure sensor and a hydraulic motor output shaft speed sensor that provide inputs to the electronic controller, wherein the output signal to the electric actuator is a function of the sensed hydraulic system pressure and the hydraulic motor output shaft speed.

* * * * *